E. F. ROWE.
COMBINED WEEDER AND CULTIVATOR.
APPLICATION FILED AUG. 26, 1915.
1,212,563.
Patented Jan. 16, 1917.
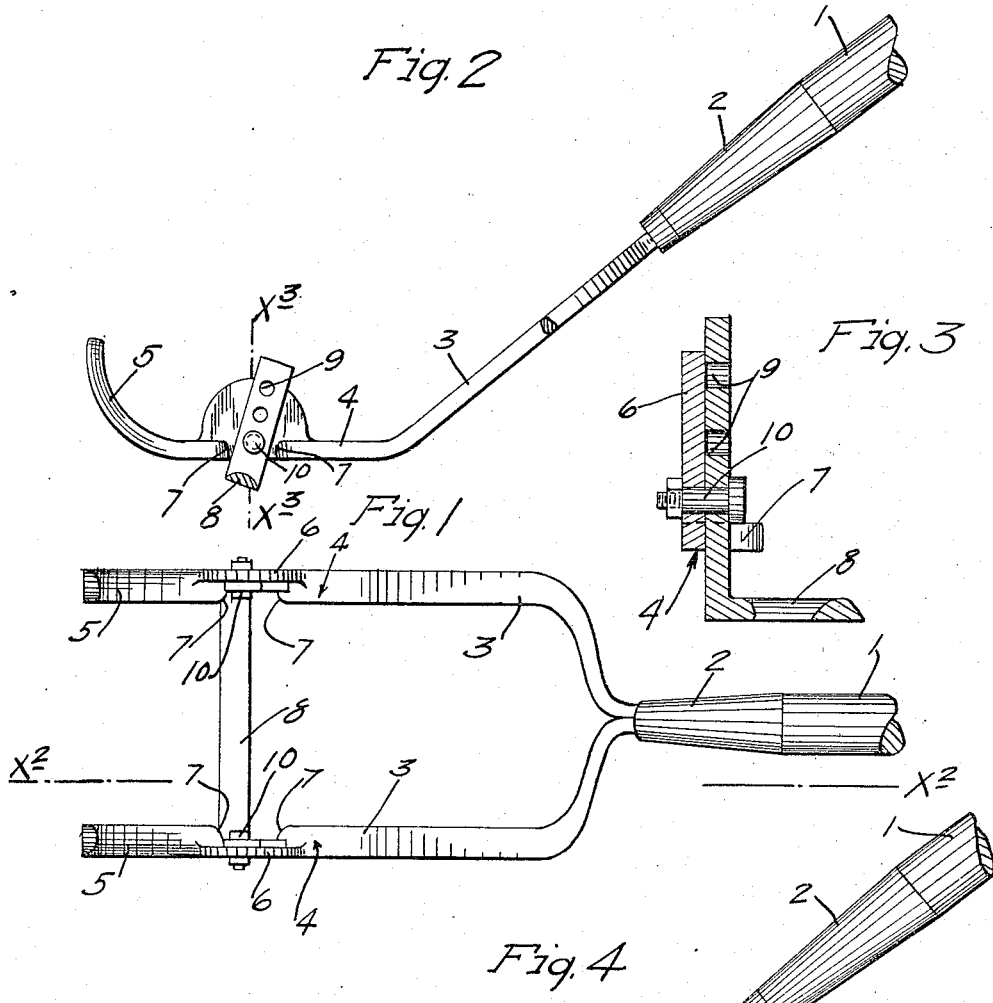
WITNESSES
E. C. Skinkle
INVENTOR
Elijah F. Rowe
BY HIS ATTORNEYS

UNITED STATES PATENT OFFICE.

ELIJAH F. ROWE, OF BIG FALLS, MINNESOTA.

COMBINED WEEDER AND CULTIVATOR.

1,212,563. Specification of Letters Patent. Patented Jan. 16, 1917.

Application filed August 26, 1915. Serial No. 47,457.

*To all whom it may concern:*

Be it known that I, ELIJAH F. ROWE, a citizen of the United States, residing at Big Falls, in the county of Koochiching and State of Minnesota, have invented certain new and useful Improvements in Combined Weeders and Cultivators; and I do hereby declare the following to be a full, clear, and exact description of the invention, such as will enable others skilled in the art to which it appertains to make and use the same.

My invention has for its object to provide an improved farm, or garden tool or cultivator adapted for use to simultaneously cut weeds a predetermined distance below the surface of the soil and to form a dust blanket on the surface of the soil, such as is required in so-called dry farming, and which is desirable in all soil cultivation to conserve the moisture in the ground.

Generally stated, the invention consists of the novel devices and combinations of devices hereinafter described and defined in the claim.

The invention is illustrated in the accompanying drawings wherein like characters indicate like parts throughout the several views.

Referring to the drawings: Figure 1 is a plan view showing the improved tool; Fig. 2 is a vertical section taken approximately on the line $x^2$ $x^2$ of Fig. 1; Fig. 3 is an enlarged vertical section taken approximately on the line $x^3$ $x^3$ of Fig. 2; and Fig. 4 is a side elevation showing the same tool that is illustrated in the other views, but with ground engaging wheels applied thereto.

The numeral 1 indicates a handle or push pole having at its end a socket 2 that holds the contracted ends of a pair of prongs 3 bent to form ground-engaging runners 4 with upturned curved ends 5. The curved ends 5, at their outer edges, are preferably made quite sharp, so that they may be used to cut off weeds, either above or slightly below the ground by lateral movement of the tool. The runner-forming portions 4 are formed with intermediately located relatively narrow lugs 6 and with longitudinally spaced stop shoulders 7 located inward of the said lugs.

The numeral 8 indicates a cutting bar sharpened at both edges and provided with upturned parallel ends having vertically spaced perforations 9. Nut-equipped pivot bolts 10 are passed through alined perforations 9 and through perforations in the lugs 6, so that they pivotally support the cutting bar with freedom for limited oscillation forward and backward between the limiting stops 7, which latter engage the upturned ends of the said cutting bar. The said cutting bar is preferably of hardened steel. By placing the bolts 10 in different holes 9, the cutting bar may be located different distances below the runners 4, so that it will cut any desired depth below the surface of the soil.

When the tool is placed with the runners on the ground and is drawn rearward, the cutting bar will be rocked forward, as shown in the drawings, so that it will have a downward slant in the direction of the cut, and hence, will tend to crowd its way into the ground as far as permitted by the runners. When the tool is forced forward, the cutting bar will be rocked backward and assume a forward inclination. It will thus be seen that the tool will always automatically assume an inclination in the direction in which it is forced to cut. This is, of course, a highly important action and makes the tool also to operate, because it does not require that the tool be tightly pressed down onto the ground, or that the operator bar or handle be moved upward or downward to change its inclination in order to keep the tool properly cutting below the surface of the soil.

A tool of this kind will cut off weeds below the surface of the soil the desired depth required to kill the weeds, and furthermore, it will loosen up the entire surface of the soil and form a loose, light dust blanket which will conserve the moisture in the soil. All persons familiar with so-called dry farming or with the principles involved therein, will appreciate the importance of this so-called dust blanket. The tool therefore, performs two highly important functions, to-wit, the destruction of the weeds and the conditioning of the soil to conserve moisture.

When desired, the handle may be raised slightly and the curved ends 5 pressed down, so as to form channels in the soil into which cut worms will fall and along which they will travel, and thereby reduce very materially the damage that they will do to plants.

The tool shown in Fig. 4 is like that above described, but has small wheels or rollers 11 applied to the rear portions of the runners 4 and depending slightly below the same, so as to reduce the frictional contact between the tool and the ground.

In the drawings, the cultivator is shown as designed for use as a hand-operated garden tool, but the principles of the construction involved, may be used in large sized devices, such as animal or tractor drawn cultivators of a size suitable for use on farms.

The arrangement of the knife or other form of tool to oscillate below the intermediate portion of the ground engaging runner or runners, whereby the depth of cut is limited by the runners, I consider broadly new. By the term "runners" I mean any device which will run or travel along the ground and serves as a support for the knife or cutter to limit the depths of cut of the latter into the ground.

What I claim is:

A cultivator having a ground-engaging runner and a ground-engaging tool, said ground-engaging tool being mounted intermediate the ends of said runner, the front and rear portions of the runner thereby forming stops to limit the depth of cut of the ground-engaging tool.

In testimony whereof I affix my signature in presence of two witnesses.

ELIJAH F. ROWE.

Witnesses:
H. C. GROVE,
G. H. GUNHEIM.

Copies of this patent may be obtained for five cents each, by addressing the "Commissioner of Patents, Washington, D. C."